US008564405B2

(12) United States Patent
Barragan Trevino et al.

(10) Patent No.: US 8,564,405 B2
(45) Date of Patent: Oct. 22, 2013

(54) REMOTELY MONITORING FIELD ASSETS

(75) Inventors: Alfonso Javier Barragan Trevino, Monterrey (MX); Herbert Rose, Ashburn, VA (US)

(73) Assignee: Vendwatch Telematics, LLC, Austin, TX (US)

( * ) Notice: Subject to any disclaimer, the term of this patent is extended or adjusted under 35 U.S.C. 154(b) by 913 days.

(21) Appl. No.: 12/687,685

(22) Filed: Jan. 14, 2010

(65) Prior Publication Data
US 2010/0191370 A1 Jul. 29, 2010

Related U.S. Application Data

(63) Continuation-in-part of application No. 12/353,695, filed on Jan. 14, 2009, now Pat. No. 8,269,604.

(51) Int. Cl.
*G05B 19/00* (2006.01)
*H04Q 5/22* (2006.01)
*G06F 17/00* (2006.01)

(52) U.S. Cl.
USPC ........ 340/5.92; 340/10.41; 700/233; 700/236

(58) Field of Classification Search
USPC ................. 340/1.1, 5.1, 5.9, 5.92, 10.1, 10.4, 340/10.41; 700/231, 233, 236, 90, 213, 700/232, 244; 709/247; 710/68
See application file for complete search history.

(56) References Cited

U.S. PATENT DOCUMENTS 6,163,811 A * 12/2000 Porter ........................... 709/247
6,754,558 B2 * 6/2004 Preston et al. ................ 700/236

* cited by examiner

*Primary Examiner* — Brian Zimmerman
*Assistant Examiner* — Sara Samson
(74) *Attorney, Agent, or Firm* — Trop, Pruner & Hu, P.C.

(57) ABSTRACT

Disclosed methods, systems, and apparatuses remotely monitor a plurality of field assets. Device discovery may be conducted to find a communication path through a personal area network (PAN) coordinator to an operations center. A plurality of states are monitored for individual field assets of the plurality of field assets. In response to trigger events, monitored states are selectively included in data sets that may be parsed, tokenized, encoded, encrypted, and forwarded through networks to an operations center.

22 Claims, 8 Drawing Sheets

US 8,564,405 B2

REMOTELY MONITORING FIELD ASSETS

This application is a continuation-in-part of U.S. patent application Ser. No. 12/353,695, filed Jan. 14, 2009, the content of which is hereby incorporated by reference.

BACKGROUND

1. Field of the Disclosure

The present disclosure generally relates to monitoring field assets.

2. Description of the Related Art

Field assets such as vending machines may be monitored manually to check inventory levels. Manually monitoring such field assets may be cost-prohibitive and time-consuming.

DESCRIPTION OF THE EMBODIMENT(S)

Figure 1:
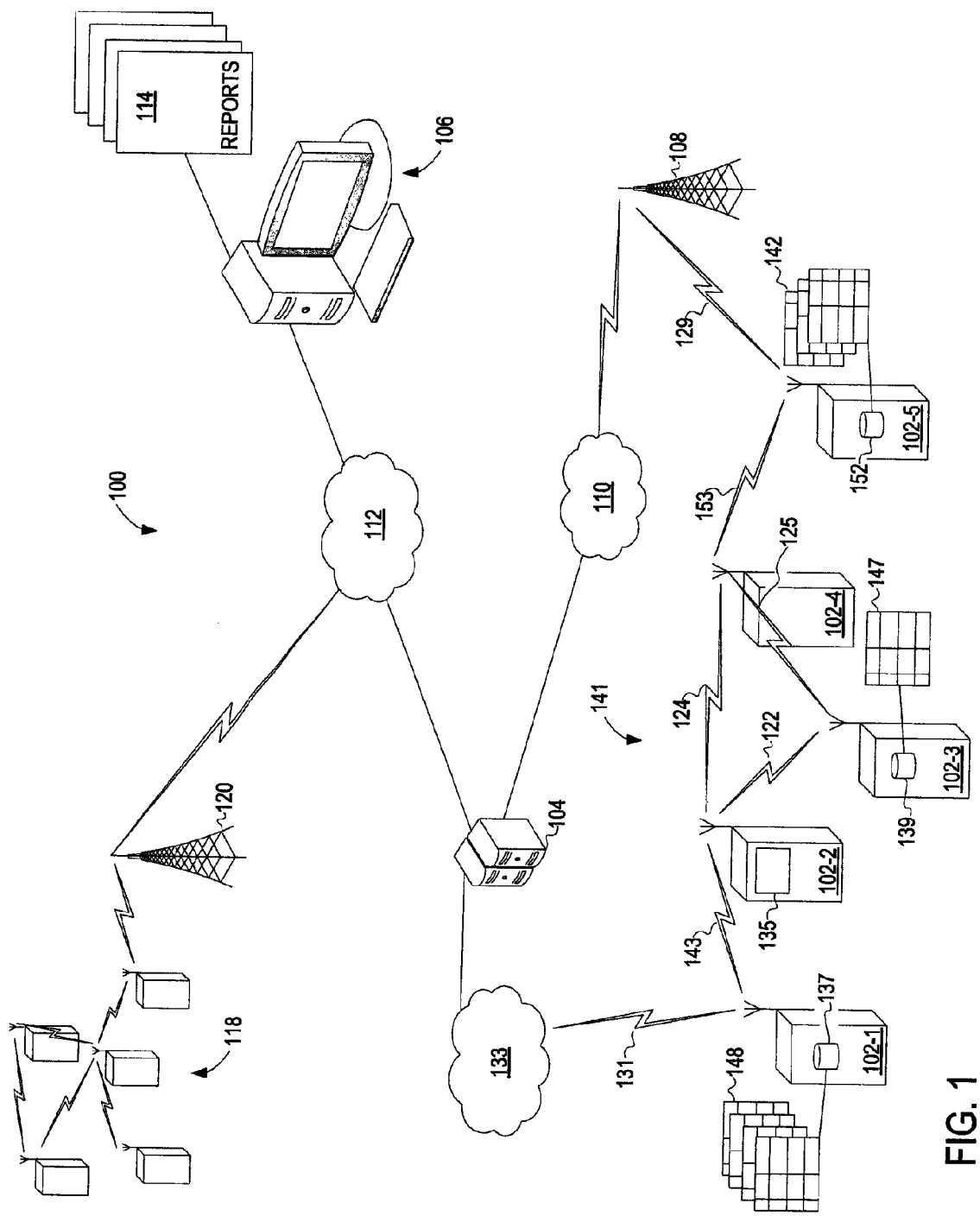
FIG. 1 illustrates a representative environment for remotely monitoring field assets.

In one aspect, a disclosed method for processing vending machine data includes receiving a token list, receiving vending machine data as a text stream, and comparing a plurality of text streams to predetermined tokens. If portions of the text stream correspond to predetermined tokens, the method includes replacing the text stream portions with the predetermined tokens to result in tokenized data. The tokenized data can be transmitted or compressed further and then transmitted.

In some embodiments, the tokenized data is further compressed prior to transmission. Tokens in the tokenized data are replaced with bit codes to result in encoded, tokenized data. Replacing tokens is determined at least in part by the frequency of use of tokens within the tokenized data. A number N of the most frequently used tokens is replaced with bit sequences that are shorter than the number of bits required to transmit the tokens. A number M of the next most frequently used tokens is replaced by other bit sequences that are longer than the first bit sequences. Remaining tokens are replaced with still further bit sequences. The compressed, tokenized data is then transmitted to an operations center, operations server, central processor, or centralized site for analysis and reporting. In some embodiments, the data is transmitted to a personal area network (PAN) router and then forwarded to a PAN coordinator. The transmitted data may include, for example, product inventory data, sales transaction data, error code information, and currency inventory information.

In another aspect, a disclosed vendor interface system includes a processor and at least one port adapted for at least one of a ZigBee™ radio, a DEX transmission module, and a card reader. The vendor interface system further includes a tokenization module (e.g., tokenization instructions stored on a computer readable medium and executable by a processor) enabled for comparing portions of a text stream to predetermined tokens. If a text stream portion from the text stream corresponds to a predetermined token, the tokenization module replaces the text stream portion with the predetermined token to result in tokenized data. The vendor interface system further includes an encoding module (e.g., encoding/compression instructions stored on a computer readable medium and executable by a processor) for replacing tokens in the tokenized data with bit codes to result in encoded, tokenized data. The length of bit codes used to replace the tokens is determined at least in part by the frequency of use of the tokens within the tokenized data. For frequently used tokens, a shorter bit code may be used for replacing the tokens. For example, if eight bits are required to transmit a token, a 4-bit code may be used to replace the eight most frequently used 8-bit tokens.

The vendor interface unit may further include a formation module (e.g., formation instructions stored on a computer readable medium and executable by a processor) for forming a personal area network (PAN). The vendor interface may also include a router module (e.g., routing instructions stored on a computer readable medium and executable by a processor), an endpoint module (e.g., endpoint operation instructions stored on a computer readable medium and executable by a processor), a gateway module (e.g., PAN coordinator instructions stored on a computer readable medium and executable by a processor), a discovery module (e.g., field asset discovery instructions stored on a computer readable medium and executable by a processor), and a path selection module (e.g., path selection instructions stored on a computer readable medium and executable by a processor). The path selection module communicates with neighboring VIUs to select a path for sending DEX data, for example, to a central processing location. The discovery module communicates with neighboring VIUs to establish and maintain a PAN according to predetermined criteria for minimizing interference, transmission costs, transmission distances, and the like. Predetermined criteria may also include signal strength from neighboring formation elements and signal strength associated with communication signals from external communication networks (e.g., public land mobile networks, WiFi networks, etc.).

In accordance with disclosed embodiments, an operations center may request specific information regarding one or more field assets. For example, an operations center may ping one or more field assets to determine whether any field assets are low on product inventory. Such a ping is a trigger event that causes field assets to respond with any relevant data. Accordingly, the operations center may broadcast to each remote asset a request for product inventory levels. In response, and if necessary, each remote asset may conduct device discovery and find a communication path to the operations center. In some embodiments, the communication path includes a master controller located in or local to one of the remote assets. Client controllers may time their transmissions of inventory levels to accomplish collision avoidance by determining whether other field assets within a cluster are then communicating. In this way, field assets wait their turn and do not "talk over" one another. Additionally, remote assets may communicate through a mesh network and find an optimized primary path and optimized secondary path for transmission of a requested data set to the operations center. In this way, a requested data set may be sent through a series of field assets with client controllers that successively forward the requested data set through one or more master controllers to the operations center. In some cases, communication paths remain static; however, malfunctions and other events may dictate that individual remote assets within a cluster dynamically adjust to changes in available communication paths. Accordingly, disclosed embodiments may include self adjusting features that adapt to changing conditions regarding available paths to optimize delivery of requested data sets to operation centers while minimizing the risk of interference.

In one aspect, a disclosed method of remotely monitoring a plurality of field assets includes conducting device discovery to find a communication path through a master controller to an operations center. In some embodiments, the communication path is through at least one client controller that is in direct communication with one or more other field assets. A plurality of states for individual field assets are monitored and may be assembled into one or more data blocks. Example states that may be monitored include product inventory amounts, currency inventory amounts, sales data, temperature data, alarm data, and other operational data. In some embodiments, the monitored states are parsed, combined compressed, encrypted and encoded. Responsive to a trigger event, the encoded states may be transmitted to an operations center. Trigger events may be from a master controller, from an alarm state, from a scheduled report interval (e.g., timeout), or from user input at the operations center. The master controller may be associated with a subscriber identity module (SIM), and in some embodiments, the master controller communicates through a transceiver using one or more mobile telephone protocols.

In another aspect, a disclosed field asset tracking system includes a product detection system, a currency tracking system, a transaction report system, and an operating conditions system. The product detection system contributes product inventory information to a data set. Similarly, the currency tracking system contributes currency inventory information, the transaction report system contributes transaction information, and the operating conditions system contributes operating condition information to the data set. The field asset tracking system includes a controller communicatively coupled to each of the product detection system, the currency tracking system, the transaction report system, and the operating conditions system. A transmitter adapted for transmitting a portion of the data set is communicatively coupled to the controller, at least one operations center, a local (i.e., local to the transmitter) field asset, and a remote (i.e., remote from the transmitter) field asset. In some embodiments, the disclosed field asset tracking system includes an encoder that parses, combines, compresses, encrypts and encodes the data set. A report generator included with the field asset tracking system extracts data from the data set on a per field-asset basis. The data set may include a DEX industry standard format, which is a protocol for digital exchange in the vending machine industry. Some disclosed field asset tracking systems include a further transmitter communicatively coupled to a cluster of further field assets. Local transmitters may communicate using IEEE 802.15.4 low-rate wireless personal area network (WPAN) standards and other such protocols. In some embodiments, local transmitters time their transmissions to avoid collisions with other transmitted signals.

In still another aspect, an apparatus is disclosed for processing field asset data. The apparatus includes a processor for generating a local data set responsive to a trigger event. The local data set includes one or more of: currency inventory information (e.g., cash in bill validation units or coins in coin collection devices), product inventory information, transaction information (e.g., sales of units by selection, cashless transactions, etc.), alarm status, door openings, and operating condition information. The apparatus further includes a receiver enabled for receiving a remote data set from one or more remote field assets. A compression system integrates the remote data set and the local data set into a data block and a transmitter sends the data block to a master controller for further routing to an operations center.

In the following description, details are set forth by way of example to enable one of ordinary skill in the art to practice the claimed subject matter without undue experimentation. It should be apparent to a person of ordinary skill that disclosed embodiments are examples and not exhaustive of all possible embodiments. Regarding reference numerals used to describe elements in the figures, a hyphenated form of a reference numeral typically refers to a specific instance of an element and the un-hyphenated form of the reference numeral typically refers to the element generically or collectively. Thus, for example, element "102-1" refers to an instance of a field asset, which may be referred to collectively as field assets 102, and any one of which may be referred to generically as a field asset 102.

Disclosed embodiments can use DEX protocol. A DEX file is typically an ASCII code-based file that can be used to electronically communicate information such as sales amounts, currency in bill validators, currency in coin boxes, sales of units by selection, pricing, alarms, door openings, and so on. The DEX file is commonly used for auditing and monitoring field assets such as vending machines. A DEX file may be created locally by a field asset controller (e.g., vending machine controller) or other processor typically co-located with the field asset. In some embodiments, a field asset controller simulates data and transmits a DEX file in DEX format over a DEX port. In vending machine applications, a VIU may be configured as a DEX port. A DEX file is sent from the DEX port to a remote location such as a central processor or network operation center. Device discovery and transmission path discovery conducted by disclosed embodiments may include configuring field assets to communicate through PANs, local area networks (LANs), wide area networks (WANs), and the like. For example, DEX files may be forwarded over data networks, mobile telephone voice/data networks, and/or the Internet to a central location for analysis and reporting.

FIG. 1 illustrates a representative environment 100 for remotely monitoring field assets in accordance with disclosed embodiments. As shown, field assets 102-1 through 102-5 form a first cluster 141 of remote assets (e.g., vending machines). First cluster 141 communicates with operations server 104 through communication asset 108 (e.g., mobile telephone tower or WiFi hotspot). In some embodiments, operations server 104 resides at a co-location or operations center that assembles operation and inventory data from multiple sources including first cluster 141 and second cluster 118. As shown, second cluster 118 communicates through communication asset 120 (e.g., a cellular telephone tower or WiFi hotspot), through network 112 (e.g., an Internet, a wide-area network, local area network, etc.) with operations server 104. Communication asset 108 may communicate wirelessly or through wired connections through network 110 with operations server 104. Operational and inventory data collected and assembled by operations server 104 may be accessed by client 106 (e.g., a data processing system), may be in the form of one or more reports 114, and may be presented on a per field-asset basis. A user may send information requests from client 106 to first cluster 141 and/or second cluster 118 to request specific information and data. In addition, a user may configure, program, troubleshoot, or monitor (e.g., in substantial real-time) selected field assets in first cluster 141 or second cluster 118 using client 106.

Field assets 102-1 through 102-5 are enabled for device discovery and determination of an optimal path for efficiently sending data to operations server 104. During device discovery, assets 102-1 through 102-5 may respond to trigger events, scheduled report intervals, user requests, and predetermined conditions for forming field asset clusters and assigning master controller duties to one or more controllers. As shown in FIG. 1, field asset 102-5 has a communication link 129 with communication asset 108 and can therefore serve as a master field asset, with a master controller for first cluster 141. In addition, field asset 102-1 has available a communication link 131 through network 133 to operations server 104 and may serve as a master or comaster field asset. First cluster 141 may operate as a mesh network. Further, first cluster 141 may, in accordance with disclosed embodiments, conduct device discovery and path optimization to discover one or more communication links for sending requested data to operations server 104.

Within first cluster 141, individual field assets may determine an optimal path for sending operational and inventory data. In addition, individual field assets may practice collision avoidance techniques to prevent interference. For example, transmissions from separate field assets may occur at slightly different frequencies or at different times. Redundant communication links may also be established between and among field assets to optimize transmission efficiency in the event of outages, malfunctions, or the like. As shown in FIG. 1, field asset 102-2 may communicate with field asset 102-5 through field asset 102-3 (using communication link 122, communication link 125, and communication link 153) or through field asset 102-4 (using communication link 124 and communication link 153). In the event that field asset 102-3 is unable to forward data on behalf of field asset 102-2, then communication link 124 may be used to send the data to field asset 102-5 through field asset 102-4. Alternatively or in addition, data from field asset 102-2 may be multicast to a plurality of field assets including field asset 102-3 (through communication link 122), field asset 102-4 (through communication link 124), and through field asset 102-1 (through communication link 143). Operations server 104 may assemble received data and discard any redundant data that may result from such multicasting.

As shown, field asset 102-3 includes a storage 139 (e.g., a memory or a hard drive), with a data set 147 which may include data blocks with parameters that are monitored and stored regarding field asset 102-3. Data set 147 may be presented in DEX format and may include one or more fields that are requested by a user (e.g., a user of data processing system 106). As shown, complete or partial copies of data set 147 also reside on data set 142, which resides on storage 152, and data set 148, which resides on storage 137. As shown, data set 148 and data set 142 are part of a collection of data sets that may be assembled by one or more master (or co-master) controllers for collecting, parsing, encoding, compressing and sending to operations server 104. As shown, data sets from individual field assets may be multicast to help ensure that the data successfully reaches operations server 104. Operations server 104 may send acknowledgment signals to field assets 102. Such acknowledgment signals may be through broadcast (i.e., to all field assets), through multicast (i.e., to selected field assets), or unicast (i.e., to one field asset, through direct or indirect communication links). In such ways, first cluster 141 and its field assets 102 employ robust, two-way communication links that contribute to secure and efficient transfer of data for field assets 102.

As shown in FIG. 1, field asset 102-1 includes video display 135 for providing a graphical interface that informs a user regarding the status of field assets 102. For example, a user may receive reports on display 135 regarding alarms, inventory levels, sales data, and operating conditions related to any one or more of field assets 102. As shown, the reports may be accessed in real-time in response to user input provided to field asset 102-2. Field assets may be in two-way communication with operations server 104, client 106, or other components and display 135 may provide messages and status information regarding communication channels, for example.

Figure 2:
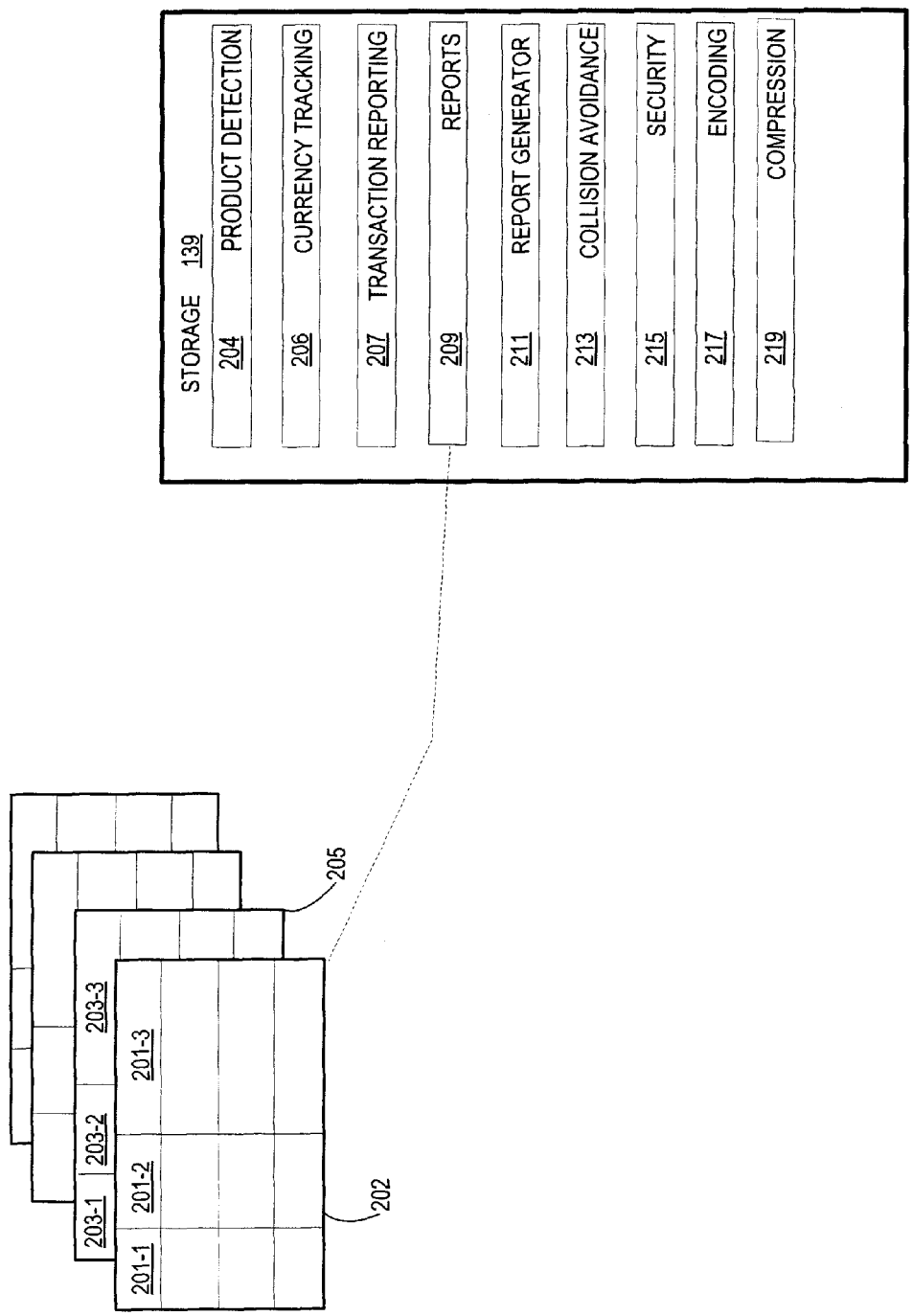
FIG. 2 illustrates additional aspects of a storage from FIG. 1 with modules for remotely monitoring field assets.

FIG. 2 illustrates additional aspects of storage with modules (e.g., product detection system 204) for remotely monitoring field assets. As shown, storage 139 includes a plurality of systems that contribute to a data set that is transmitted to an operations center or central data server for tracking one or more field assets (e.g., vending machines). As shown, storage 139 includes product detection system 204 which contributes product inventory information to a data set (e.g., data set 202) that is transmitted from a remote asset or cluster of remote assets to a central data server or operations center. Product detection system 204 may receive signals regarding inventory and functionality from drop sensors and the like. For a monitored field asset that is a vending machine, product detection system 204 may include sensors that detect which products within the field asset are in inventory and available for sale. Accordingly, product detection system 204 may include counters, pressure sensors, infrared sensors, and other sensors that may be used to track or determine inventory levels of products. Currency tracking system 206 contributes currency inventory information to the data set. Currency tracking system 206 may, for example, track the number of pennies, dimes, nickels, quarters, and other coins. In addition, currency tracking system 206 may track the number of $1 bills, $10 bills, $5 bills, and $20 bills in the field asset. Transaction reporting system 207 contributes transaction information to the data set. For example, transaction reporting system 207 may contribute to the data set the total sales amount for a period, the total number of cashless (e.g., credit card sales) sales for the period, the frequency of transactions, the time of transaction, and the total number of transactions.

As shown in FIG. 2, storage 139 includes report generator 211. Report generator 211 processes requests for data and generates customized reports 209 including the requested data. The transmission of data may be overly time-consuming and resource-intensive. In some cases, the cost of transmitting data is directly related to the amount of data transferred. Therefore, report generator 211 optimally only sends the data that is requested. In some embodiments, data is sent in response to predetermined trigger events. Trigger events may be generated locally, such as through persistent alarm states. Trigger events may be based on predetermined parameters (e.g., minimum inventory levels) that are remotely programmed and may be remotely adjusted. Alternatively, trigger events may be based on scheduled report intervals, power outages, or real-time remote requests, as examples.

As a further example of a trigger event, a field asset may be programmed to automatically send to an operations center data related to an alarm state (e.g., a persistent alarm). For example, a trigger event may be set as a temperature alarm in a vending machine that indicates a high temperature for more than two hours (i.e., is persistent). During operation, if the temperature registers high for two hours or some other preconfigured time, and the trigger event correspondingly occurs, report generator 211 generates and stores report 202. As shown, report 202 includes columns 201-1 through 201-3. Columns 201-1 through 201-3 are for illustrative purposes and may be populated with various parameters associated with alarms. For example, each row in a column may be populated with alarm event data, such as the type of alarm, the start time of the alarm, the duration of the alarm status, and the like. Report generator 211 may log information into reports that may be transmitted to an operations center and/or archived locally. As shown, reports 209 include archived report 205 with columns 203-1 through 203-3.

In accordance with some disclosed embodiments, field assets practice collision avoidance to avoid interference while transmitting. Accordingly, collision avoidance system 213 may listen to determine whether other remote assets within a cluster are communicating before attempting to transmit reports. In other cases, transmissions may be timed accordingly to a predetermined schedule. Accordingly, collision avoidance system 213 may process instructions from a master controller or operations center for scheduling the transmission of reports.

In some embodiments, collision avoidance system 213 or other components of storage 139 participate in communication path optimization and device discovery. For example, upon certain events (e.g., installation of a field asset or a reboot), test signals may be generated from client controllers and transmitters. In some cases, such test signals are staggered in time or frequency to prevent interference. A receiver from each field asset may determine the strength of signals received from other remote assets. In some cases, signals are identified by a unique network identifier of the field asset responsible for generating it. Additionally, a timestamp may be associated with a received signal. Through such sessions of device discovery and communication path optimization, a cluster of field devices may automatically configure itself to optimally transmit reports to an operations center. In some cases, based on such sessions, field assets are clustered, reclustered, and sub-clustered to optimize transmission efficiencies.

As shown in FIG. 2, storage 139 includes security system 215 which may associate a security key or other security features (e.g., encryption) with a transmitted data set. Encoding system 217 may employ an encoding or encryption scheme to further secure transmitted data sets and ensure compatibility with one or more communication protocols. In some embodiments, field assets communicate using mobile telephone protocols, Internet protocols, radio frequency transmissions, and the like. In addition, disclosed field assets may use voter comparators to determine which of a plurality of communication paths is more reliable and efficient. In such cases, encoding system 217 may encode data sets and reports for transmission over an optimized communication path. Additionally, encoding system 217 may decode signals and requests sent by operation centers and other field assets. Compression system 219 may employ one or more compression schemes to reduce the size of transmission from field assets. In some embodiments, as data is collected from field assets and passed toward a master controller that communicates with an operations center, the data from multiple remote assets may be compressed and combined to reduce the amount of data that is ultimately transmitted. If a charge is associated with the amount of data sent between communications asset 108 and network 110 (FIG. 1), such compression techniques may save money.

Figure 3:
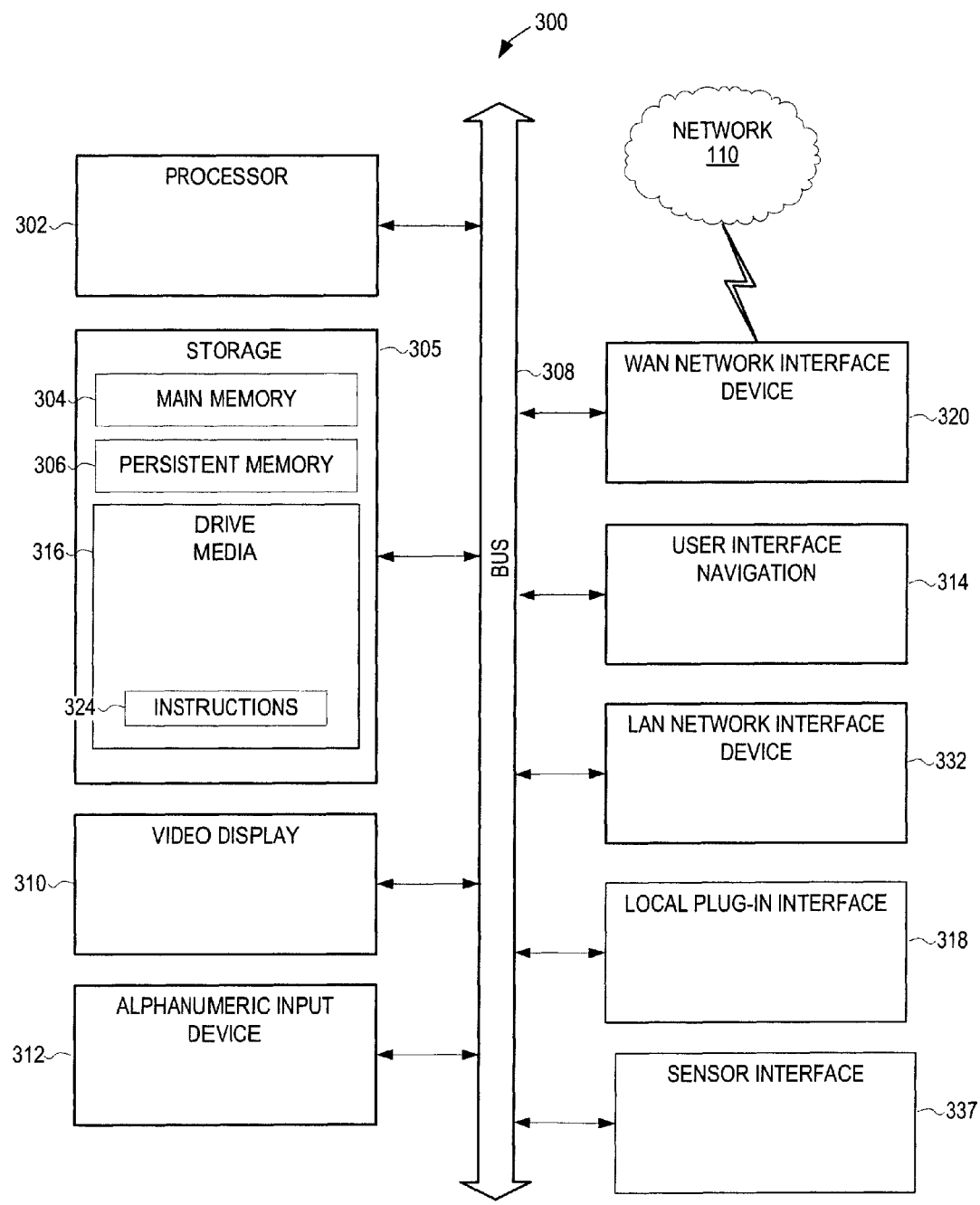
FIG. 3 illustrates a data processing system for use with disclosed embodiments to remotely monitor field assets.

FIG. 3 illustrates, in block diagram form, a data processing system 300 within which a set of instructions may operate to perform one or more of the methodologies discussed herein to remotely monitor field assets. Data processing system 300 may be similar to or identical to controllers (e.g., master controllers, comaster controllers, or client controllers) within field assets 102 (FIG. 1). Data processing system 300 may operate as a standalone device or may be connected (e.g., networked) to other data processing systems. In a networked deployment, data processing system 300 may operate in the capacity of a server or client data processing system (e.g., client 106 in FIG. 1) in a server-client network environment, or as a peer computer in a peer-to-peer (or distributed) network environment. Example data processing systems include, but are not limited to, client controllers for field assets (e.g., vending machines), master controllers for field assets, personal computers (PCs), tablet PCs, personal data assistants, operations center machines, cellular telephones, smart phones, web appliances, network routers, switches, bridges, clients, servers, or any machine capable of executing a set of instructions (sequential or otherwise) that specify actions to be taken by that machine. Further, while only a single data processing system is illustrated, the term "data processing system" should also be taken to include any collection of data processing systems that individually or jointly execute a set (or multiple sets) of instructions to perform any one or more of the methodologies discussed herein.

As shown, data processing system 300 includes a processor 302 (e.g., a microcontroller, a central processing unit, a graphics processing unit, or any combination of the same) and storage 305, which may communicate via bus 308. As shown, storage 305 includes main memory 304, persistent memory 306, and drive media 316. Drive media 316 includes instructions 324 and may be used to store reports and data sets regarding one or more field assets, which may be remote from or local to data processing system 300. Data processing system 300 may further include a video display unit 310 (e.g., a light emitting diode display, a liquid crystal display, or a cathode ray tube display) on which reports, data, and user interfaces for configuring data processing system 300 may be displayed. Video display 310 may be similar to or identical to video display 135 (FIG. 1) and may be populated with status information regarding field assets. In some embodiments, video display 310 is enabled as a touch-screen to receive user input. As shown, data processing system 300 also includes an alphanumeric input device 312 (e.g., a keyboard, roller ball, touch screen, etc.), user interface (UI) navigation device 314 (e.g., a remote control, joystick, or mouse) for navigating a user interface, providing user input regarding reporting, and accessing stored information. As shown, data processing system 300 includes wide area network interface device 320 for communicating with network 110. WAN interface device 320 may communicate using mobile telephone protocols, microwave frequencies, or radio frequencies to an operations center. Alternatively, WAN interface device 320 may communicate through some combination of network cables, fiber optic cables, or telephone lines to the operations center. In any event, WAN network interface device 320 provides a communication link between one or more field assets or clusters of field assets to an operations center or to another component (e.g., a colocation) that is communicatively coupled to an operations center. LAN network interface device 332 provides a communication link between data processing system 300 and other field assets. LAN network interface device may communicate through Bluetooth, radio waves, microwaves, infrared signals, sound waves, telephone lines, network cables, fiber optic cables, or wirelessly using IEEE 802.15.4 low-rate wireless personal area network (WPAN) standards, as examples.

As shown, data processing system 300 includes local plug-in interface 318 which may be used by field personnel to directly connect data processing system 300 to other portable field assets or monitoring equipment. For example, field personnel may carry a laptop computer that communicates directly (wirelessly or otherwise) with data processing system 300 through local plug-in interface 318 to troubleshoot, update, interrogate, or configure data processing system 300, instructions 324, and other components. Sensor interface 337 collects data from one or more sensors (not depicted) including product inventory sensors, temperature sensors, currency inventory sensors, and the like.

As shown, drive media 316 may be embedded with one or more sets of instructions and data structures (e.g., instructions 324) embodying or utilized by any one or more of the methodologies or functions described herein. The instructions 324 may also reside, completely or at least partially, within the main memory 304, within persistent memory 306, within WAN network interface device 320 or within other components of data processing system 300 during execution.

Instructions 324 may further be transmitted or received over a network 110 (e.g., from an operations center) via WAN network interface device 320 utilizing any one of a number of transfer protocols (e.g., broadcast transmissions, HTTP). While the persistent storage 322 is shown in an example embodiment to be a single medium, it may include multiple media (e.g., a centralized or distributed database, and/or associated caches and servers) that store one or more sets of instructions. Accordingly, it may be any machine-readable medium that is capable of storing, encoding or carrying a set of instructions for execution by the machine (i.e., data processing system) and that cause the machine to perform any one or more of the methodologies of the present invention, or that is capable of storing, encoding or carrying data structures utilized by or associated with such a set of instructions. It may include, but not be limited to, solid-state memories, optical and magnetic media, and carrier wave signals.

As disclosed herein, instructions 324 may include instructions for conducting device discovery to find an optimal communication path through a master controller to an operations center, instructions for monitoring a plurality of states for individual field assets of the plurality of field assets, instructions for encoding a portion of the plurality of monitored states, and instructions for transmitting through the communication path the encoded portion of the plurality of monitored states. In addition, stored within storage 305 may be one or more sets of instructions that enable data processing system 300 to perform as or with a product detection system, a currency tracking system, a transaction report system, and an operating conditions system.

Figure 4:
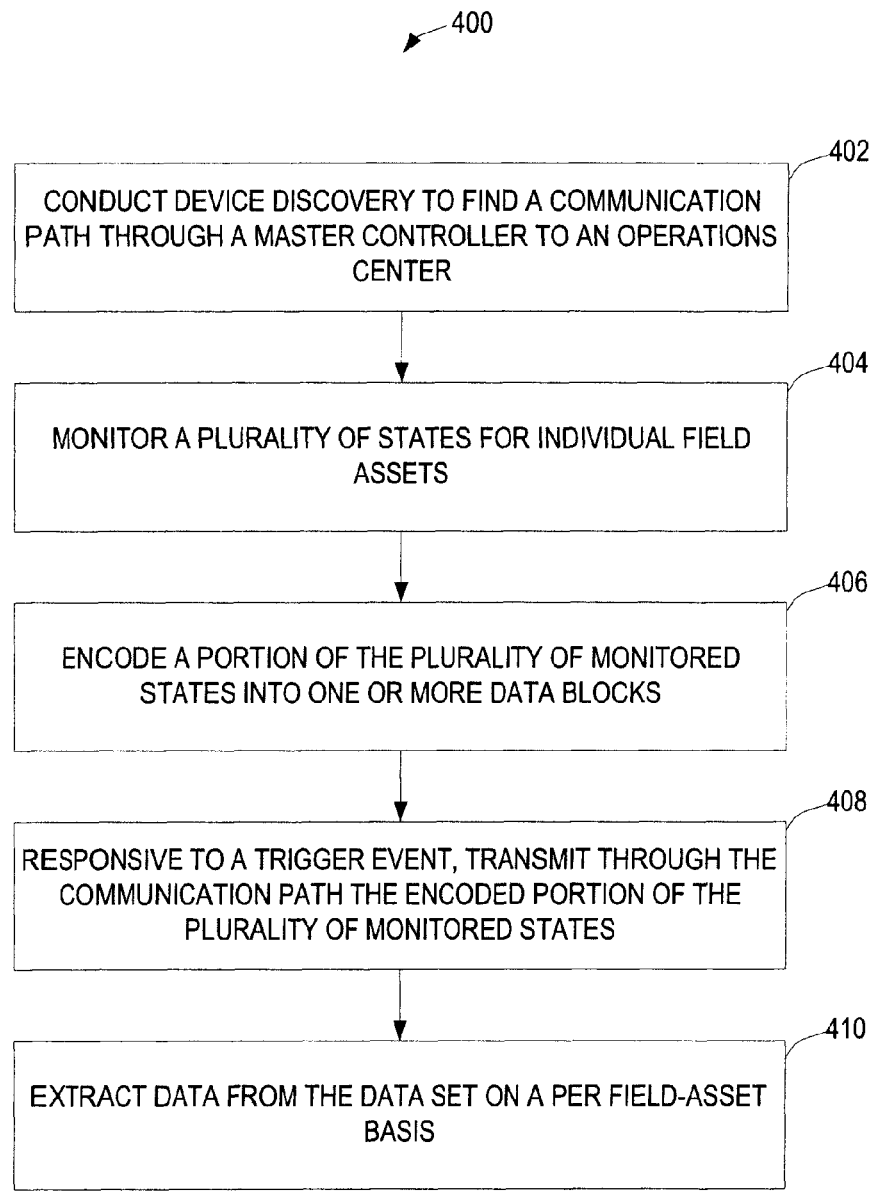
FIG. 4 illustrates a methodology for remotely monitoring field assets.

FIG. 4 illustrates a method 400 for remotely monitoring field assets in accordance with disclosed embodiments. As shown, method 400 includes conducting (block 402) device discovery to find a communication path through a master controller to an operations center. In some embodiments, the communication path is through at least one client controller that is in direct communication with one or more other field assets. A plurality of states for individual field assets are monitored (block 404) and encoded (block 406) into one or more data blocks. In some embodiments, the monitored and encoded states are compressed. Responsive to a trigger event, the encoded states are transmitted (block 408) to the operations center. The trigger event may be from the master controller, from an alarm state, from a scheduled report interval, or provided in real time from an operations center. The master controller may be associated with a SIM card, and in some embodiments, the master controller communicates through a transceiver using one or more mobile telephone protocols. Example states that are monitored and encoded may relate to product inventory amounts, currency inventory amounts, sales data, temperature data alarm data, and other operating data. In some embodiments, data is extracted (block 410) individually for each field asset (from a transmitted data set) and stored separately for each field asset.

Disclosed embodiments can compress and encrypt data to promote privacy and efficiency during data transport. When DEX data is read from a vending machine, the information is received as a text stream. Many text sequences within the text stream recur frequently. Embodiments utilize this when preparing the DEX file for transmission across commercial cellular networks, for example. Common text sequences can be replaced with a single character within a DEX text string. The original text sequences are reinserted by software on the reception end before the DEX data is analyzed and reported. This process may be referred to as "tokenization" of the input stream. A static list of tokens and the text that they represent is maintained both on the transmission end (e.g., by transmitting radios) and the reception end (e.g., by receiving software) to facilitate tokenization.

Further compression may be achieved by replacing the most often used tokens with variable length bit codes. For example, a single character may be represented by eight bits in computer memory, which is then transmitted across various networks and structure. The eight most often used tokens can be reduced to a 4-bit sequence instead of an 8-bit sequence. The next 16 most often used tokens can further be reduced to a 6-bit sequence rather than an 8-bit sequence. The remaining tokens can be sent as 9-bit sequences. The uneven distribution of token frequency within a DEX file results in fewer 6-bit sequences being transmitted than 9-bit sequences, thus resulting in fewer bytes being transmitted. The overall effect of these compression techniques for transmission can be a 60% decrease in DEX file size with no loss of data. This compression rate can be consistently achieved without dependence on the size of the DEX file or type of field asset (e.g., vending machine).

As an additional benefit, these compression techniques, when used in conjunction with each other, act as an encryption mechanism. To reconstruct the DEX data from the transmitted stream, a Huffman decompression scheme may be applied with a fixed set of variable-length tokens, followed by a de-tokenization algorithm, both of which use an unpublished, static list of tokens. Reconstruction of DEX data would be difficult without access to the token list, which provides a level of security.

Accordingly, an embodied method of processing field asset data includes receiving a token list and receiving field asset data as a text stream. Portions of the text stream are compared to predetermined tokens. As examples, the text stream data may include one or more of: inventory data, sales transaction data, error code information, and currency inventory information. If a portion of the text stream corresponds to a predetermined token, the text stream portion is replaced with the predetermined token. This tokenized data can then be transmitted. If further compression is desirable, some embodiments replace tokens in the tokenized data with bit codes to result in encoded tokenized data. The frequency of use of a token can determine the length of bit code that replaces the token. For example, 4-bit sequences can be used to replace the eight most frequently used tokens, 6-bit sequences can be used to replace the next 16 most frequently used tokens, and 9-bit sequences can be used to replace the remaining tokens.

In some embodied methods, a number N (e.g., eight) of the most frequently used tokens is determined for the tokenized data. In some embodiments, each token N is replaced with a corresponding sequence that has a number X (e.g., four) bits, wherein X=(log 2(N))+1. The encoded, tokenized data can then be transmitted, which is more efficient and secure compared to transmitting the tokenized data.

Further processing can be achieved by determining a number M tokens that are the next most frequently used. If M=16 and N=8, this second level processing results in tokens being replaced if the tokens are between the $9^{th}$ and $24^{th}$ most frequently used, inclusive. The length of bit sequence for replacing these second-level tokens can be determined by Y=(log 2(M))+2. For example, if M=16, the 16 tokens will be replaced by 6-bit sequences. The encoded, tokenized data with variable length bit sequences (e.g., 4-bit and 6-bit sequences) can be transmitted instead of the tokenized data or raw data to save on transmission costs.

In some embodied methods, any remaining tokens in the tokenized data can be replaced by a 9-bit sequence. The encoded, tokenized data is then transmitted. The data can be transmitted to a PAN router which in turn forwards the data to a PAN coordinator, which in turn forwards the data to an operations center (e.g., operations server, operations client, etc.). The PAN router may be co-located with a vending machine, for example, and data for the co-located vending machine may be combined with the encoded, tokenized data and forwarded. The data for the co-located vending machine may also be tokenized and encoded according to the above techniques.

In embodied systems, PAN elements (e.g., VIUs) are often in relatively close proximity with each other. Relatively long range transmission may be achieved using protocols such as ZigBee™™. Short range transmission may be achieved using protocols such as Bluetooth. In a PAN made up of various field assets distributed at a site, one element (e.g., a VIU) can be preconfigured or may automatically configure itself to be a gateway module (i.e., PAN coordinator). Other elements (e.g., VIUs) may be configured to be either PAN routers or PAN endpoints. Some PAN elements (e.g., VIUs) are preconfigured or limited automatically to function as endpoints. Endpoints send DEX data to PAN routers which forward the DEX data to PAN coordinators for sending to an operations center. Sending the DEX data to an operations center may include relaying the data through proprietary communication networks, cellular data/phone networks, the Internet, WANs, WiFi networks, and the like. Networks including PANs that are configured in accordance with disclosed embodiments may include device discovery, path discovery, and self-healing characteristics.

Figure 5:
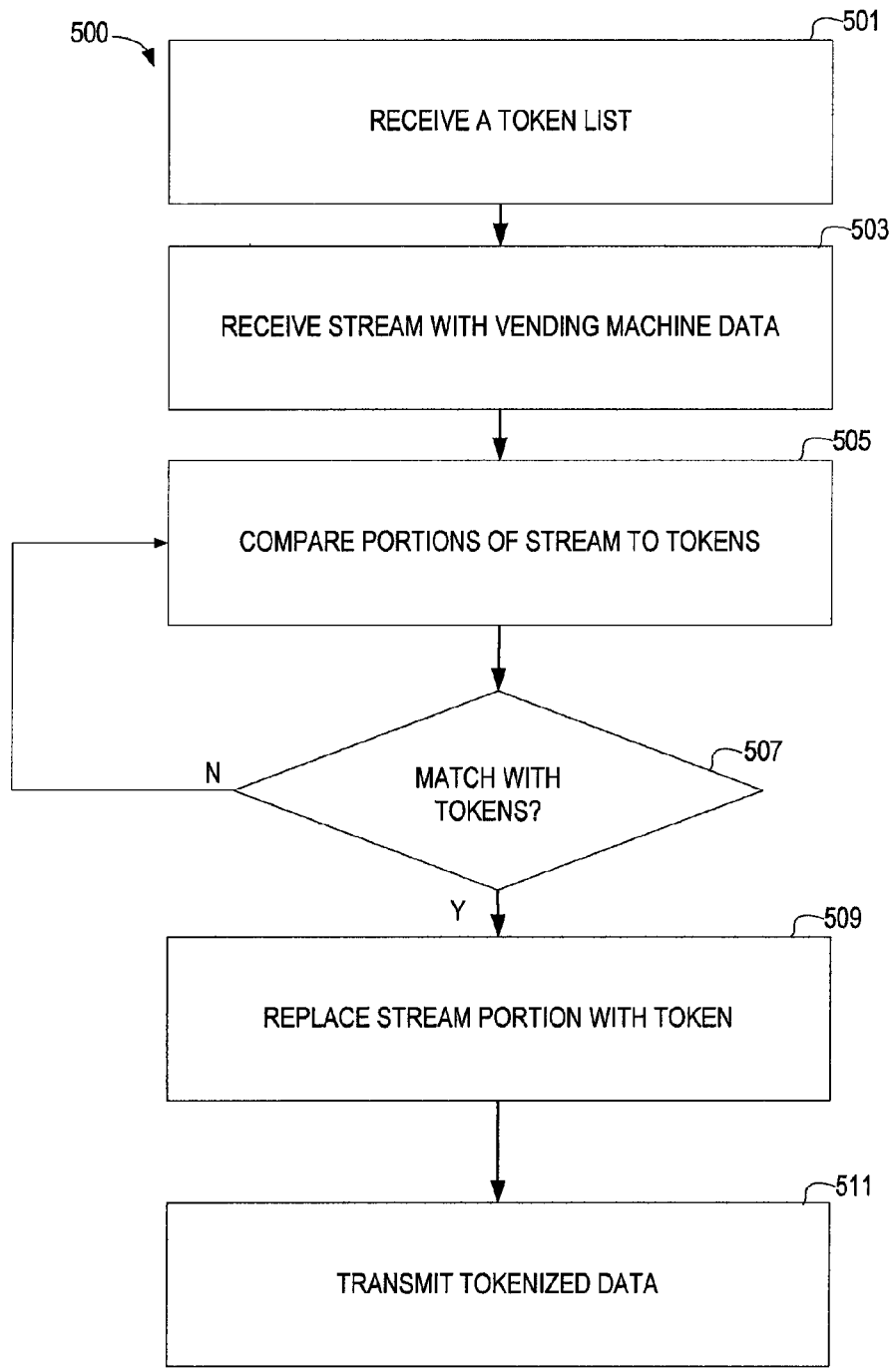
FIG. 5 illustrates a methodology for reducing the amount of data transmitted from a field asset.

The figures illustrate aspects of disclosed embodiments that tokenize and further compress DEX data. For example, FIG. 5 illustrates an embodied method 500 for reducing the amount of DEX data transmitted from field assets such as vending machines. As shown, a token list is received (block 501) by the field asset. The token list is also accessible by any device (e.g., PAN router, PAN coordinator, network operations center, etc.) that de-tokenizes data sent from the field asset. The token list may be adapted, for example by the vendor interface unit or the network operations center, to optimize compression. The adapted token list would then be distributed as needed to the field asset, network operations center, or other device that tokenizes or detokenizes the data. As shown in FIG. 5, vending machine data is received (block 503) as a text stream. Portions of the stream are compared (block 505) to tokens from the token list. If a portion of the stream matches (block 507) a token, the matching portion of the stream is replaced (block 509) with the corresponding token. The tokenization process is iteratively performed to result in optimally tokenized data. The tokenized data is then transmitted (block 511).

Figure 6:
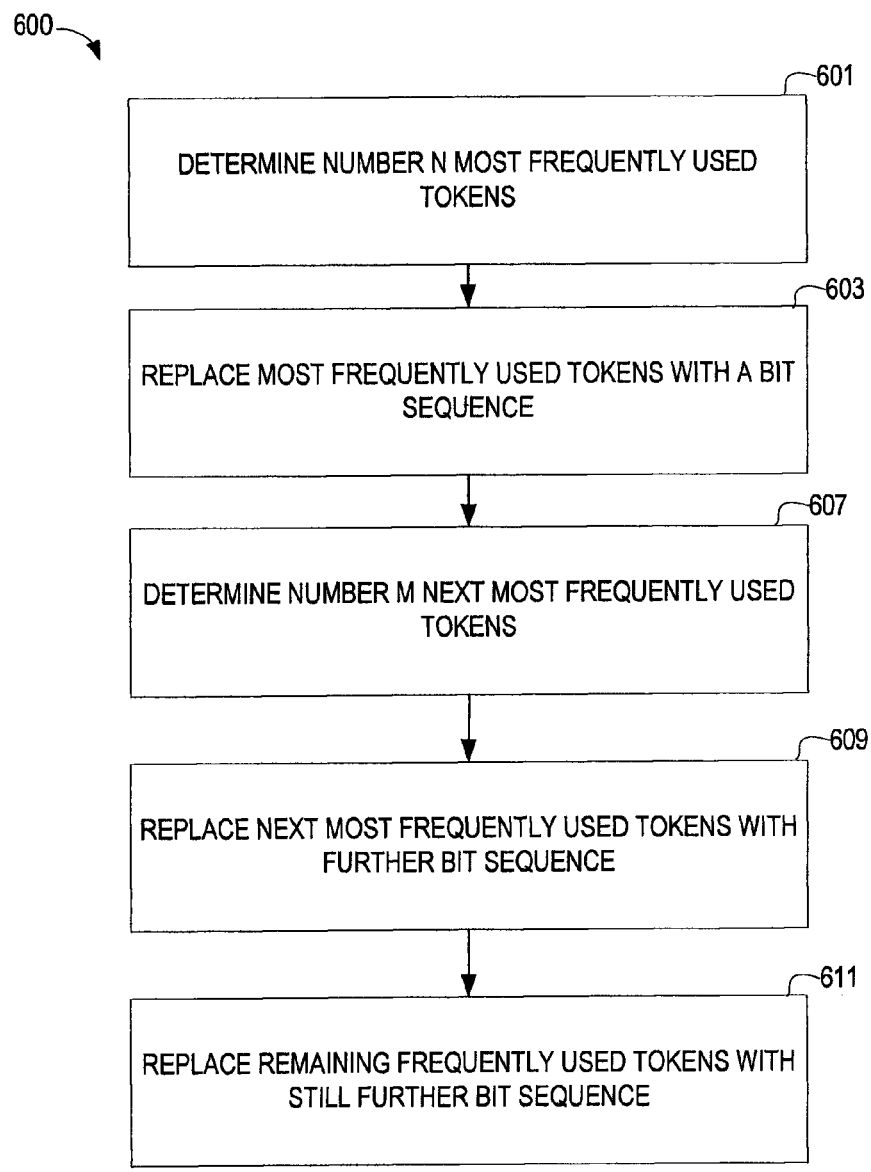
FIG. 6 illustrates a methodology for further compression of tokenized data.

FIG. 6 illustrates an embodied method 600 for further compression of the DEX data by encoding the tokenized data. The encoding is performed before the tokenized data is transmitted. In some embodiments, non-tokenized data is sent from a field asset (e.g., vending machine) to a PAN router or PAN coordinator over a LAN and then the non-tokenized data is combined and/or compressed according to method 500 and/or method 600. In other words, non-tokenized data or non-encoded, tokenized data may be sent over the LAN, but when the data is sent from the LAN to a WAN or third party network with data charges, for example, the data is encoded to further reduce traffic levels. In this way, raw data from a cluster of field assets may be accumulated, for example at a PAN router or PAN gateway, and then tokenized and/or encoded to save transmission costs.

As shown in method 600 (FIG. 6), a number N (e.g., eight) is determined (block 601) of the most frequently used tokens in the tokenized data. This determination can be made by counting the number of times each token from the token list appears in the tokenized data. The number N most frequently used tokens in the tokenized data are replaced (block 603) with a bit sequence that is shorter than the length of the replaced token. For example, if the tokens are 8-bit sequences, the bit sequences used to replace the tokens can be 4-bit sequences. Next, a number M of the next (i.e., after the number N tokens) most frequently used tokens are determined (block 607). For example, if M=16 and N=8, the tokens which are ranked according to frequency 9th through 24th are determined. Each of these 16 tokens is replaced (block 609) by a bit sequence shorter than the length of the tokens, but longer than the bit sequences used to replace the number N tokens. For example, the bit sequence can be a 6-bit sequence if the tokens are 8-bits long. Other tokens in the tokenized data can be replaced (block 611) by a set of bit sequences that are 9-bits long, for example.

Embodied methods for compressing and sending data can be carried out by vending interface systems that link vending machines to communications networks used to send DEX data. An embodied vendor interface system (e.g., vendor interface unit) includes a processor and one or more ports. The ports can be adapted for a ZigBee™ radio, a DEX module, or a card reader, as examples. Embodied vendor interface systems include a tokenization module that compares portions of a text stream to predetermined tokens. In a typical vending machine application, the text stream includes one or more of: inventory data, sales transaction data, error code information, and currency inventory information. In some embodiments, the text stream may only represent data that has changed since the last transmission of data. In this way, repetitive data does not have to be transmitted. Also, the text stream may include only data that was requested by an operations center, for example.

If a text stream portion corresponds to a predetermined token, the tokenization module replaces the text stream portion with the predetermined token to result in tokenized data. The vendor interface system further includes an encoding module that replaces tokens in the tokenized data with bit codes to result in encoded, tokenized data. Replacing the tokens in the tokenized data with bit streams is determined by the frequency of use of the token within the tokenized data. Variable length bit sequences can replace the tokens. For example, a first category of the most frequently used tokens is replaced by bit sequences that are shorter (e.g., 4-bits long) than the number of bits (e.g., 8-bits) required to transmit the tokens. A second category of the most frequently used tokens is replaced by further bit sequences that are longer (e.g., 6-bit) than the bit sequences for the first category. The encoded, tokenized data can be efficiently transmitted through a DEX module or a ZigBee™ radio, as examples. In the above embodiment, the tokenization module and encoding module may be software routines stored on a medium and executed by a microcontroller. A separate software or firmware based transmission module may be built into an operating system for the microcontroller and not require special programming to communicate with ZigBee™ or DEX devices. Understanding and creating any software needed to build the disclosed modules is well within the abilities of one of ordinary skill in the art without undue experimentation.

Field asset data (e.g., vending machine data) can be extracted during a polling session. Polling modes include local polling, wired polling, and/or wireless polling. Local Polling can be through a portable device that connects locally, wirelessly or otherwise to a field asset's DEX-port. Once the connection is established, the portable device extracts transactional data from the field asset to the portable device. Field collected data can be transferred from the portable device to a central processing site for analysis and reporting. Wired polling may use a modem and telephone line or other wired network connection. DEX data may be transported over an Internet or virtual private network (VPN) connection. Wireless polling enables remote access to DEX data via a network such as a cellular network or WAN.

Figure 7:
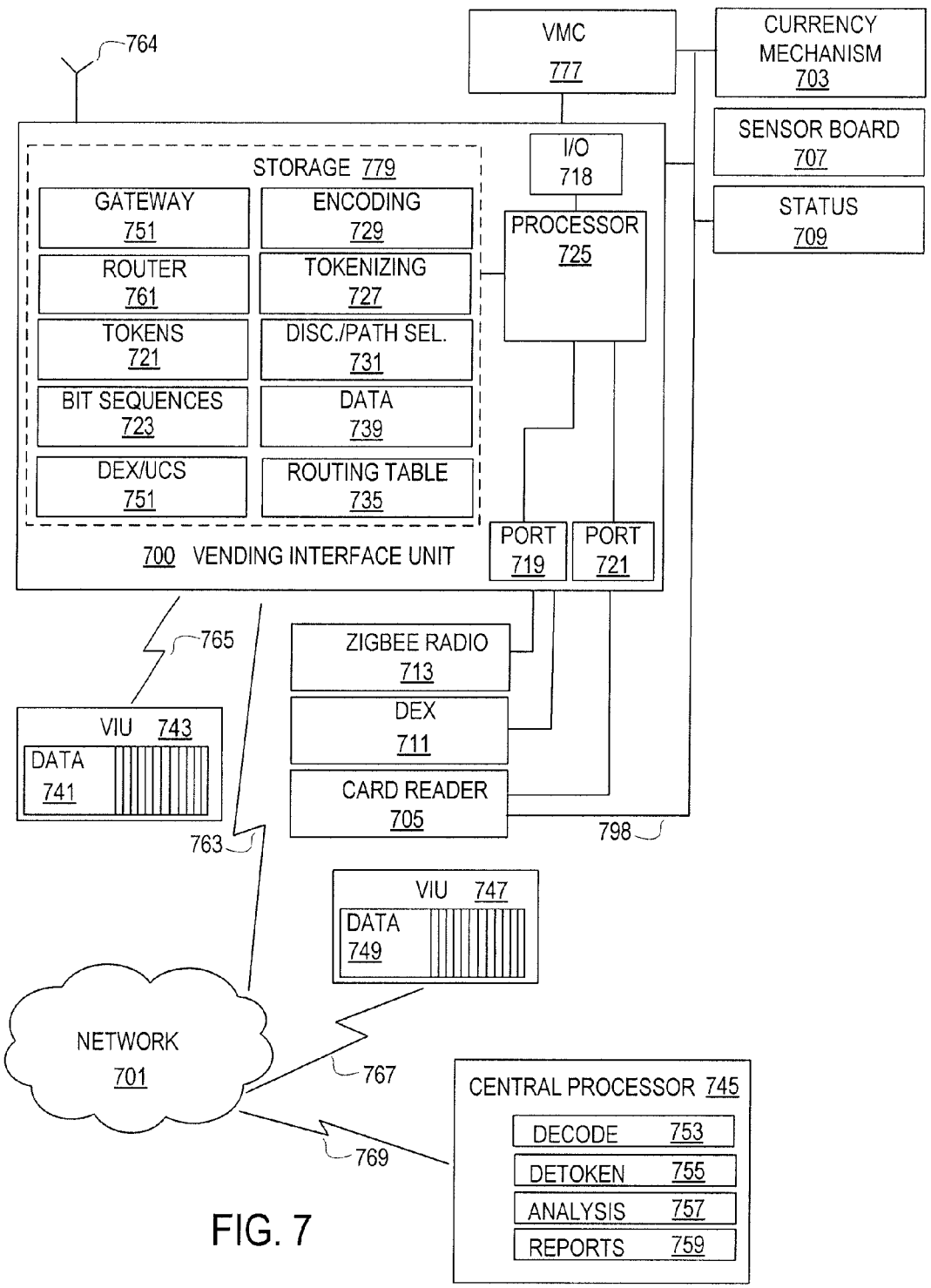
FIG. 7 depicts a vending interface unit (VIU) enabled to communicate digital exchange (DEX) data to an operations center (e.g., central processor)

An exemplary embodiment is a VIU co-located with a vending machine. FIG. 7 depicts VIU 700. VIU 700 communicates with network 701 through signal path 763. Signal path 763 may be wired or wireless and use one or more well-known or future wireless protocols. VIU 700 can operate as one or more of a router, gateway, or endpoint. As a router, VIU 700 receives data 741 from VIU 743. Data 741 may be tokenized and/or encoded according to disclosed embodiments prior to transmission to VIU 700. Data 741, with or without data 739, is transmitted over signal path 763 through network 701 to central processor 745. Alternatively, the data transmitted or relayed from VIU 700 may be transmitted to VIU 747 over signal path 767 if VIU 747 is configured as a gateway (e.g., PAN coordinator) and VIU 700 is configured as a router (e.g., PAN router).

As shown, central processor 745 includes decoding unit 753, detoken unit 755, analysis unit 757, and reports unit 759. Central processor 745 receives data from VIU 743, VIU 747, and VIU 700 through network 701 over signal path 769. Signal path 769 may be wired or wireless and use common, well-known protocols. Network 701 may include in some combination PAN(s), WAN(s), LAN(s), the Internet, cellular telephone networks, fixed data networks, and so on.

Decoding unit 753 decodes data from VIUs 700, 743, and 747. Decoder unit 753 replaces bit sequences placed in the data, for example by encoding module 729. Likewise, detoken unit 755 replaces tokens placed in the data, for example by tokenizing module 727. Detoken unit 755 must have a copy of tokens 721 and decoder unit 753 must have copy of bit sequences 723 to process data tokenized and encoded by VIU 700. The result from decoder unit 753 and detoken unit 755 is the same as raw DEX data from a vending machine co-located with VIU 700. Analysis unit 757 analyzes the DEX data and reports unit 759 generates reports based on the DEX data and potentially other data received from, for example, VIU 743 and VIU 747.

As shown, VIU 700 includes tokenizing module 727 and encoding module 729. Tokenizing module 727 and other elements within the VIU 700 may be software and/or firmware executed by processor 725. Tokenizing module 727 compares sequences of raw data from data 739 to tokens stored in tokens 721. If a sequence within the raw data matches a token within tokens 721, the sequence is replaced by the matching token. The tokenized data may be stored within data 739.

Further compression may be performed by encoding module 729. Encoding module 729 analyzes the tokenized data to determine the most frequently used tokens. Alternatively, encoding module 729 receives from tokenizing module 727 a list of tokens used, ranked according to frequency. Encoding module 729 replaces frequently used tokens with bit sequences from bit sequences 723 to reduce the amount of data that is ultimately transmitted.

As shown in FIG. 7, VIU 700 includes routing module 761 and gateway module 751. These optional modules include instructions executed by processor 725 to operate VIU 700, for example, as a PAN router or PAN gateway (i.e., PAN coordinator). If VIU 700 is a PAN router, routing table 735 is accessed to determine the proper destinations for relayed DEX data. DEX/UCS module 751 includes instructions executed by processor 725 to send and receive DEX protocol data with VIU 700. Over the air updates to VIU 700 and its modules may be received over antenna 764. Discovery and path selection module 731 can include machine executable instructions for processor 725 and enable VIU 700 to participate in automatic discover of neighboring field assets and path selection to efficiently transmit DEX data to central processor 745.

Vendor interface units such as VIU 700 can be configured in multiple ways. For example, the VIU may be configured as a DEX port that can be used to read DEX data from any device that supports the DEX/UCS protocol including controller boards, coin mechanisms, and proprietary sensor boards. For example, VIU 700 could be integrated with DEX unit 711 to read DEX data from currency mechanism 703, sensor board 707, or status alarm 709. Currency mechanism 703 is shown for convenience and may include functionality related to coin mechanisms, bill mechanisms, and cashless transaction mechanisms. Sensor board 707 may be a proprietary board for monitoring one or more elements (e.g., temperature, door openings, tilt, humidity, vibration, etc.) of a vending machine or other field asset.

VIU 700 is shown with port 719 and port 721, which may be serial ports. In embodied VIUs with two serial ports, one serial port may be connected to a proprietary sensor board and the other serial port connected to a coin mechanism, for example. The VIU (e.g., VIU 700) can automatically combine data from both DEX ports into a single file. For example, port 721 could be connected to currency mechanism 703 and port 719 could be communicatively coupled to sensor board 707, and DEX data would be combined and stored as data 739.

A VIU may be used as a ZigBee™ gateway. In some embodiments the serial port (e.g., port 719 in FIG. 7) is connected to a ZigBee™ radio (e.g., ZigBee™ radio 713 in FIG. 7) that can be configured as a PAN coordinator or PAN router in a ZigBee™ network (e.g., a portion of network 701). Exemplary embodiments of ZigBee™ radios are from Digi-International™ When configured as a ZigBee™ gateway, the port will be used to read DEX from surrounding VIU's (e.g., PAN routers) in the area. For example, if VIU 700 is configured as a ZigBee™ gateway, port 719 could be used to read DEX data from local VIUs (e.g., data 749) from VIU 747 and data 741 from VIU 743. As shown, VIU 743 communicates over signal path 765, which may be wired, wireless, or some combination of the same.

A VIU may also be configured as a card reader port used to read data from intelligent card readers. For example, port 721 may be configured to read data from card reader 705. As shown, VIU 700 may be communicatively coupled directly to card reader 705. Alternatively, VIU 700 may be communicatively coupled to card reader 705 through multi-drop bus (MDB) 798. VIU 700, as shown, can also communicate through I/O 718 with vending machine controller 777 to further monitor, access, and provide information and data related to the vending machine or other field asset served by VIU 700. I/O 718 can use wired or wireless protocols, or VMC 777 and VIU 700 can be on the same board or chip. A VIU serial port (e.g., port 719 or port 721) may also be disabled if it is not connected to an external device. This helps prevent erroneous error messages associated with that port.

VIUs continue to evolve. The appended claims are not intended to be restricted to certain VIU architectures or technologies; however, nonlimiting examples are provided for purposes of illustration. Exemplary general packet radio service (GPRS) VIUs (e.g., VIU 700) may be designed around a radio device such as a Wavecom™ GR64 GPRS module. The Wavecom™ GR64 GPRS is a mobile to mobile communications module that can function as a quad band GSM/GPRS class 10 compact radio device. A VIU employing such a radio device (e.g., Wavecom™ GR64 GPRS) can be programmed with a script that is loaded into the GR64 module itself. The VIU can support: (1) remote configuration from GPRSBETA (e.g., through antenna 764); (2) over the air updates (e.g., through antenna 764 in FIG. 7); and (3) local configuration via serial port (e.g., through port 719). This VIU also supports combining sensor board and coin mechanism DEX files into a single data file. Exemplary VIUs of this type have two serial ports and support configurations including: disabled, DEX, card reader, and ZigBee™ gateway.

Other GPRS VIUs may be designed around a Wavecom™ Q27 GPRS module, for example. Exemplary modules have a separate ARM processor and external RAM, allowing a user to substitute the Q27 module with different hardware as needed. Such modules may be programmed with C++ software stored in nonvolatile RAM and support remote configuration from GPRSBETA, OTA updates, and local configuration via serial port. The VIU may also have a ZigBee™-type radio, which may use a MicroChip™ MiWi protocol stack to send DEX data wirelessly from remote VIUs to a gateway VIU. Remote VIUs (e.g., VIU 743) may be deployed without the GPRS chip (e.g., Wavecom™ Q27). A PAN may be deployed with a single GPRS VIU with a GPRS module and with multiple VIUs that lack a GPRS module. In such cases, all DEX data can be sent to a centralized location (e.g., central processor 745) via a GPRS enabled VIU (e.g., VIU 700). Such VIUs support combining proprietary sensor boards (e.g., sensor board 707) and coin mechanism DEX information into a single data file. Exemplary GPRS VIUs include two serial ports (e.g., port 719 and port 721) that can be configured as disabled, DEX, card readers, and/or ZigBee™.

Further VIUs can be designed around single-board computers such as the picoFlash™ from JK Microsystems, Inc™. Exemplary picoFlash™ single board computers are based on an RDC R8822 microcomputer which enables a 16-bit, single-chip microcomputer that is software compatible with the 80C186 family of processors. It is also DOS compatible to facilitate easier programming. Exemplary VIUs with single board configurations have Ethernet capability, multiple serial ports, and a console port. These VIUs may be programmed with C/C++ using development tools provided by a manufacturer, a distributor, and/or third parties. Exemplary PicoFlash™ VIUs support remote configuration from GPRSBETA and local configuration via web browser. In some embodiments, PicoFlash™ VIUs are programmed to support over the air programming. PicoFlash™ VIUs may be connected to an Ethernet connection to communicate with a centralized processor (e.g., control center). In some embodiments, PicoFlash™ VIUs only support wired Internet connections to communicate with a centralized processor (e.g., central processor 745). Exemplary PicoFlash™ VIUs support combining DEX information from proprietary sensor boards (e.g., sensor board 707) and coin mechanisms (e.g., currency mechanism 703) into a single data file. In addition, they may have two serial ports (e.g., port 719 and port 721) that may be configured to support disabled status, DEX port, ZigBee™ gateway functionality, and connection to card readers.

ZigBee™ VIUs configured as disclosed herein to tokenize and further compress DEX data may operate as endpoints on a ZigBee™ network. These endpoint ZigBee™ VIUs may require the presence of a ZigBee™ gateway to transfer data to a central processor. A ZigBee™ wireless network may replace a serial cable from a gateway VIU to a vending machine. Endpoint VIU functionality may be changed by programming a ZigBee™ gateway to effectuate the change. Exemplary endpoint VIUs have one serial port configured to support DEX. In some cases, endpoint VIUs do not support programming; therefore over the air programming is unnecessary. In other cases, endpoint VIUs can be configured via GPRSBETA or other techniques.

Figure 8:
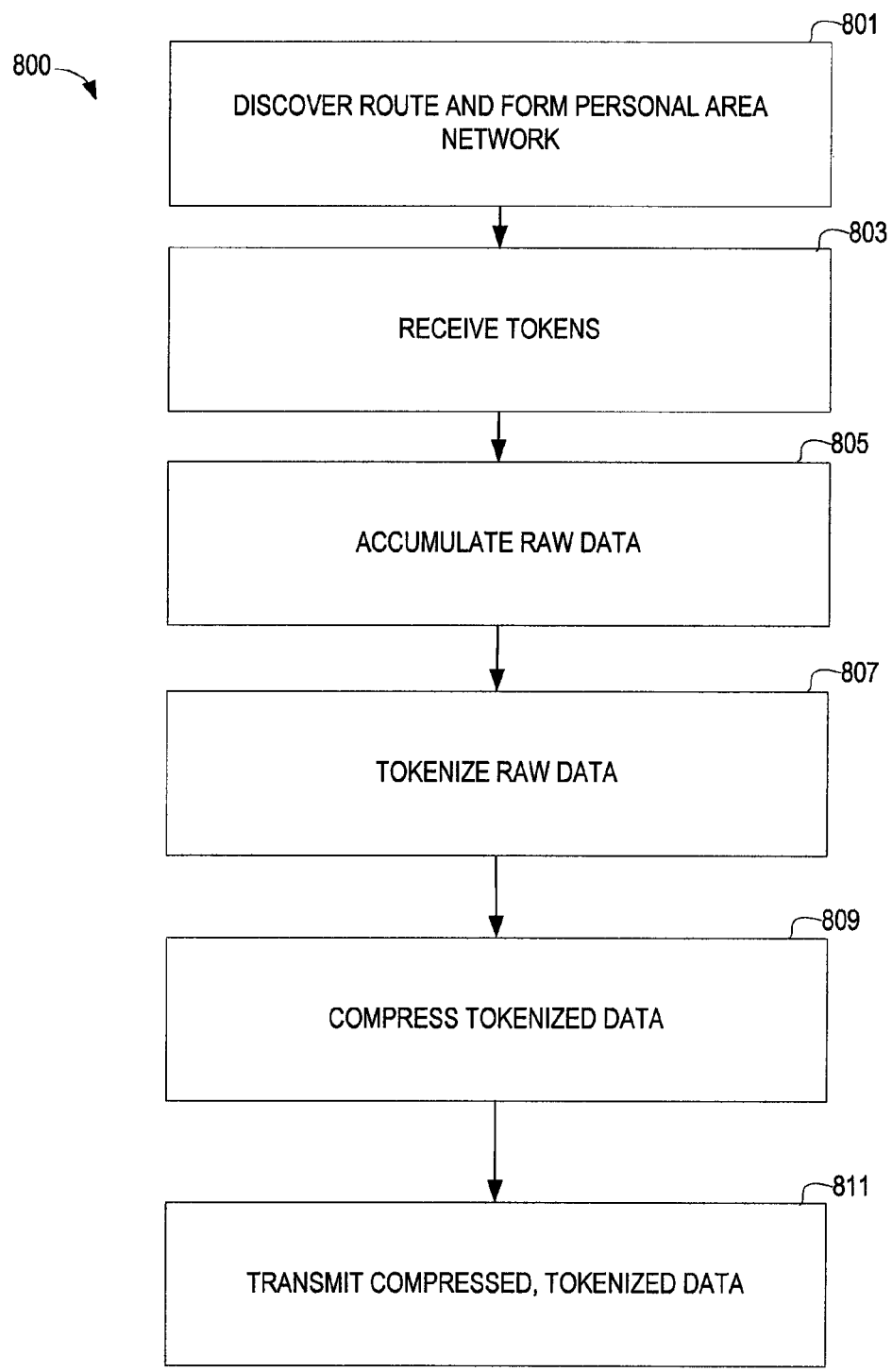
FIG. 8 illustrates a methodology for reducing the amount of data transmitted from a field asset.

FIG. 8 illustrates a method 800 of reducing DEX data transferred. Optionally, a route is discovered (block 801) and a PAN is formed. The route and PAN are manually configured in some embodiments. Tokens are received (block 803) and raw data is accumulated (block 805). The raw data is tokenized (block 807) and then the tokenized data is further compressed (block 809) by encoding it with variable length bit sequences in place of frequently used tokens in the tokenized data. The compressed, tokenized data is transmitted (block 811).

Referring to FIG. 7, VIU 700 allows extraction and sending of vital information from a DEX file (e.g., a DEX file stored in data 739) without extracting and sending the entire DEX file. This can provide more timely notification to central processor 745 of critical information, for example when an error code is first detected. If sensor board 707 detects an alarm condition, processor 725 executes instructions to compress, encrypt, and send the alarm data to central processor 745. Such instructions may be stored in processor 725 in a persistent storage (e.g., ROM, which is not depicted for clarity). Instructions executed by processor 725 may also be stored on storage 779 in the form of subroutines or otherwise. VIU 700 may also send summary sales data to central processor 745. Summary sales data may be an abbreviated version of DEX data stored in data 739. For example, if data 739 has stored information detailing every product in a vending machine and the sales for each product, a summary of sales (e.g., total sales) of all or selected products may be determined by processor 725 analyzing data 739 according to summarizing instructions (not depicted) stored onboard processor 725 or on storage 779. The summarized sales information may be transmitted according to a predetermined schedule (e.g., once daily at midnight) or in response to a trigger event (e.g., a door opening, reaching a sales threshold, not reaching a sales threshold after a given time).

Instructions for processor 725 may be updated via port 719, port 721, MDB bus 798, or over antenna 764. In some embodiments, sensor board 707 determines when a visit from a technician occurs and transmits to central processor 745. This determination may be made from sensor board 707 detecting that a pushbutton switch, for example, has been depressed by the technician. Alternatively, if card reader 705 detects that a technician has scanned a particular card, a determination is made that a technician has locally visited VIU 700. This information can be time stamped and forwarded to central processor 745 by processor 725 executing instructions stored on storage 779. Similarly, VIU 743 and VIU 747 can timestamp and send a signal regarding a technician's visits. Central processor 745 can accordingly track the progress of a technician as the technician visits several vending machines.

In some embodiments sensor 707 is tied to an internal or external push-button, for example, on a vending machine that allows a technician to manually trigger VIU 700 sending a "snap shot" of DEX data, in abbreviated or full form, to central processor 745. This snap shot of DEX data may be tokenized and encoded according to disclosed embodiments to reduce transmission costs. This also allows tracking of the technician's progress on his or her route and provides real-time DEX data at the time of a visit for more accurate cash reconciliation.

To track the amount of currency in a vending machine and potentially provide a cross-check for currency data provided by technicians, VIU 700 may automatically transmit currency inventory information (e.g., coin totals, bill totals, etc.) and product inventory information to central processor 745 upon a door opening or other local activity (e.g., detecting vandalism or theft attempts). The information may be transmitted again automatically upon the door closing. This "before and after" data may be used as a back-up or confirming method of determining the amount of currency and product in a vending machine immediately before and after a technician's visit.

Creating such instructions for the functionality of processor 725 is easily within the abilities of one of ordinary skill in the art without undue experimentation and without example code being specifically disclosed herein. The appended claims are not intended to be limited by use of specific examples above such as the Wavecom™ Q27 GPRS module and picoFlash™. These devices are included herein to provide example embodiments that enable machine to machine (M2M) communication as disclosed. Claimed subject matter is provided to permit transmission and reception of field asset information (e.g., DEX information) using, for example, wireless cellular network operators. VIUs may use other modules that have compatibility with one or more of GSM/GPRS/EDGE/3G/HSDPA/HSUPA or future such protocols. Communication may be made over a circuit switched data (CSD) call, using a packet mode with GPRS, EDGE, 3G, 4G, and the like. Data may also be sent over short messaging service (SMS) and structured supplementary service data (USSD), as examples.

While the disclosed systems may be described in connection with one or more embodiments, it is not intended to limit the subject matter of the claims to the particular forms set forth. On the contrary, disclosed systems are intended to include alternatives, modifications and equivalents as may be included within the spirit and scope of the subject matter as defined by the appended claims.

What is claimed is:

1. A method of processing vending machine data, the method comprising:
   receiving a token list;
   receiving the vending machine data as a text stream;
   comparing a plurality of text stream portions from the text stream to tokens from the token list;
   if a text stream portion corresponds to a token from the token list, replacing the text stream portion with the corresponding token to result in tokenized data;
   replacing the token in the tokenized data with a bit code to result in encoded tokenized data, wherein said replacing is determined at least in part on a frequency of use of the token within the tokenized data; wherein said transmitted tokenized data is the encoded tokenized data.

2. The method of claim 1, further comprising:
   determining a number N tokens most frequently used in the tokenized data; and
   for a portion of the N tokens in the tokenized data, replacing respectively each N token with a bit sequence to result in encoded tokenized data, wherein the bit sequence has a number X bits, wherein $X=(\log 2(N))+1$.

3. The method of claim 2, wherein $N=8$ and $X=4$.

4. The method of claim 2, further comprising:
   determining a number M tokens next most frequently used relative to the number N tokens in the tokenized data; and
   for a portion of the M tokens, replacing respectively each M token with a further bit sequence to contribute to the encoded tokenized data, wherein the further bit sequence has a length Y bits, wherein $Y=(\log 2(M))+2$.

5. The method of claim 4, wherein $M=16$ and $Y=6$.

6. The method of claim 5, further comprising:
   for a plurality of tokens which are not included in the number N tokens or number M tokens, replacing respectively each of the plurality of tokens with a second further sequence to further contribute to the encoded tokenized data, wherein the second further bit sequence has a length Z bits, wherein $Z=9$, wherein each token in the tokenized data has a length of 8-bits.

7. The method of claim 1, further comprising:
   receiving the transmitted tokenized data at a personal area network (PAN) router;
   forwarding the transmitted tokenized data to a PAN coordinator.

8. The method of claim 7, wherein the PAN router is co-located with a vending machine, further comprising:
   combining status data for the vending machine with the received tokenized data.

9. The method of claim 8, wherein the status data is tokenized.

10. The method of claim 9, wherein the status data is encoded and tokenized.

11. The method of claim 8, wherein the status data includes at least one of product inventory data, sales transaction data, error code information, and currency inventory information.

12. The method of claim 7, further comprising:
   relaying the transmitted tokenized data to an operations center.

13. A vending machine interface system comprising:
   a processor;
   a port adapted for at least one of a ZigBee™ radio, a DEX module, and a card reader;
   a tokenization module enabled for:
     comparing portions of a text stream to predetermined tokens, wherein the text stream includes field asset data; and
     if a text stream portion corresponds to a predetermined token, replacing the text stream portion with the corresponding predetermined token to result in tokenized data; and an encoding module for replacing tokens in the tokenized data with bit codes to result in encoded tokenized data, wherein a length of the bit codes used to replace the tokens is determined at least in part on a frequency of use of the token compared to other tokens.

14. The vending machine interface system of claim 13, further comprising:
   a router module;
   an endpoint module;
   a gateway module;
   a discovery module for discovering local field assets capable of establishing an area network; and
   path selection module for selecting a path for communicating through the area network toward a central processing location.

15. The vending machine interface system of claim 14, wherein the vending data comprises at least one of: product inventory information, currency inventory information, vending machine status information, error code information, and sales transaction information.

16. The interface system of claim 13, wherein the port is further adapted to be disabled.

17. A method of transmitting vending machine data, the method comprising:
   replacing respectively a plurality of repeated patterns in a DEX data text sequence with a token corresponding to the repeated pattern to result in tokenized data;
   ranking the corresponding tokens in the tokenized data according to frequency of occurrence;
   for a number N of the most frequently occurring tokens, replacing the tokens with respective first bit sequences that: represent the tokens and are shorter than the tokens;
   for a number M of next most frequently occurring tokens, replacing the tokens with respective second bit sequences that: represent the tokens, are shorter than the tokens, and are longer than the first bit sequence; and
   for remaining occurring tokens not included in the number M or number N tokens, replacing the tokens with third respective bit sequences that: represent the tokens and are longer than the tokens.

18. A method of remotely monitoring a plurality of field assets, the method comprising:
   conducting device discovery to find a communication path through a personal area network (PAN) coordinator to an operations center;
   monitoring a plurality of states for individual field assets of the plurality of field assets;
   tokenizing a portion of the plurality of monitored states to result in tokenized data;
   encoding the tokenized data to result in tokenized encoded data; and
   transmitting through the communication path the encoded tokenized data.

19. The method of claim 18, wherein the communication path is through a PAN router.

20. The method of claim 18, wherein the PAN coordinator communicates through a transceiver using one or more mobile telephone protocols.

21. The method of claim 18, wherein said transmitting is responsive to a trigger event initiated at an operations center.

22. The method of claim 18, wherein said transmitting is responsive to an alarm state.

* * * * *